United States Patent
Lutz et al.

[11] Patent Number: 5,834,131
[45] Date of Patent: Nov. 10, 1998

[54] SELF WARMING LOW COST TACTICAL ELECTRONICS BATTERY

[75] Inventors: Robert A. Lutz; John S. Dyle, both of Fort Wayne, Ind.; Harry W. Lutz, Toddville, Iowa

[73] Assignee: ITT Manufacturing Enterprises, Inc., Wilmington, Del.

[21] Appl. No.: 850,226

[22] Filed: May 2, 1997

[51] Int. Cl.$^6$ .................................................. H01M 10/50
[52] U.S. Cl. ................................................. 429/7; 429/62
[58] Field of Search ................................. 429/7, 62, 61, 429/120, 48, 49

[56] References Cited

U.S. PATENT DOCUMENTS

| | | | |
|---|---|---|---|
| 5,218,834 | 6/1993 | Reher et al. | 429/62 |
| 5,252,411 | 10/1993 | Yokokawa et al. | 429/62 |
| 5,480,734 | 1/1996 | Schulz et al. | 429/7 |
| 5,508,126 | 4/1996 | Braun | 429/7 |
| 5,622,789 | 4/1997 | Young | 429/7 |
| 5,645,949 | 7/1997 | Young | 429/7 |

*Primary Examiner*—Anthony Skapars
*Attorney, Agent, or Firm*—Plevy & Associates

[57] ABSTRACT

A self-warming battery for use in tactical electronics systems, having a housing containing one or more commercially available alkaline manganese dioxide battery cells, a temperature sensor disposed adjacent to the battery cells for monitoring the temperature thereof, load resistors disposed adjacent to the battery cells for cell warming, and a battery self-warming circuit disposed in the housing. The battery self-warming circuit is coupled to the battery cells and the temperature sensor, and selectively causes current flow through the battery cells in an initializing mode when the temperature sensor detects that the battery cells are below a predetermined temperature. The battery self-warming circuit also selectively operates one or more resistors disposed adjacent to the battery cells, the resistors being powered by and warming the battery cells, in a warming mode, to a setpoint temperature at which the battery cell's power delivery capability is substantially increased over the battery cell's power delivery capability when the battery cells are near the predetermined temperature; whereby the initializing mode and the warming mode enable the battery to be used in substantially less than an hour, and in extremely cold ambient environments in which alkaline manganese dioxide cells would not otherwise be capable of performing at required current and/or power delivery rates.

18 Claims, 3 Drawing Sheets

SELF WARMING LOW COST TACTICAL ELECTRONICS BATTERY

FIELD OF THE INVENTION

The present invention relates generally to batteries and more particularly to a battery system which includes a battery self-warming circuit for automatically maintaining the temperature of the system's battery cell or cells and improve the power delivery of the battery system at low temperatures.

BACKGROUND OF THE INVENTION

For military tactical electronics prime power applications, a battery system must reliably deliver power over a broad temperature range. Man portable military electronics equipment are presently powered by a family of military standard primary batteries described in military specification MIL-B-49430, entitled "Batteries, Nonrechargeable, Lithium Sulfur Dioxide." These batteries have benefited from over 20 years of development and refinement and are widely utilized in various military communications, navigation, night vision, and other electronics equipment, to provide primary power or memory holdup power.

Each battery in the family of military standard primary batteries, utilizes two or more lithium sulfur dioxide cells. The lithium sulfur dioxide cell chemistry has been widely utilized for military applications due to its low temperature operational capability (to −40 degrees F or C), high nominal cell voltage (3.0–3.1 volts open circuit), high energy density (70–80 watt hours per pound), and relatively high sustained current capability (2.0 amps typical for "D" cell batteries).

There are, however, a number of practical considerations and concerns associated with use of lithium sulfur dioxide cell based batteries, which specifically include relatively high cost and personnel safety. Regarding cost, the recent procurement price for a BA-5590 battery comprised of 10 "D" cells, a connector, a fuse, a diode, a discharge switch, a discharge resistor, an interconnect, and housing, is $53 per battery in large quantities. The costs for all other battery configurations in the MIL-B49430 family are even higher on a per watt-hour basis, since the other configurations are procured in lower quantities and/or utilize smaller, less cost efficient cell sizes in their construction.

In regard to personnel safety issues, it is well known in the art that lithium sulfur dioxide cells have been the cause of explosions in military equipment, such explosions resulting in significant personnel injury. These incidents are not surprising since the risk of violent cell explosions in a lithium sulfur dioxide cell is well documented in the art. Future incidents have been anticipated by the U.S. government despite the incorporation of safety features in the battery designs which include slow blow fuses, reverse current protection diodes, end of life discharge switches and load resistors. Due to this risk, U.S. government regulations have been implemented which mandate that for all newly developed equipment that includes a battery compartment, the battery compartment must be designed with one or more features which allows safe venting of the gases resulting from the violent venting of a battery cell. Government testing procedures emulate cell rupture and total cell venting within only several milliseconds. Acceptance criteria mandates that no battery, equipment parts or components detach from the test unit during the violent venting tests.

The risk of violent incidents increases for lithium sulfur dioxide cells as the cells approach the end of their operational life. This has prompted the U.S. government to issue a schedule of usage that limits the number of hours a battery may be used in each type of military equipment within the military's equipment inventory. Safety directives issued to the services now involve the removal and the safe discharge of batteries after the prescribed number of operational hours—regardless of the actual state of discharge of the batteries. The government schedules have been developed conservatively to assure removal and safe discharge at 75–80% of actual battery capacity. Moreover, based on reports of actual practice, batteries are often disposed of prior to the recommended usage schedule set forth in the safety guidelines, since it is convenient for field personnel to replace batteries with new ones at the end of each day of use or at the end of each mission, rather than dealing with the inconvenience of logging hours of usage. Furthermore, it has been reported that some batteries are replaced early by operational personnel to additionally increase the safety guardband. Accordingly, all these practices substantially increase the effective cost of battery operation per hour of equipment usage.

Due to the problems associated with lithium sulfur dioxide cells, interest has surfaced in the military use of alkaline manganese dioxide cells. Unlike lithium sulfur dioxide cells, it is well known that alkaline manganese dioxide cells do not have a history of violent venting and explosion incidents. Further, alkaline manganese dioxide cells have logged millions of hours of reliable use in limited temperature range commercial and personal use applications, and have the power density, on a volume basis, essentially equivalent to the power density of lithium sulfur dioxide cells. However, due to low temperature operational limitations inherent in an alkaline manganese dioxide cell, it has, up to this point in time, not been the favored approach for delivery of portable power for fielded military electronics equipment. Still, at retail, alkaline "C" or "D" cells cost only $.80 each in low quantity (i.e. 10 packs). Accordingly, it would be very desirable for alkaline manganese dioxide cells to become accepted for military use as an alternative to lithium sulfur dioxide cell-based batteries, since large recurring battery cost savings could be achieved. Use of these alternative low cost batteries for training and for tactical deployment in warm weather environments is envisioned, thus, conventional lithium sulfur dioxide cell-based batteries could be limited in use to actual warfare or very cold weather environments.

Interest in alkaline manganese dioxide cells is also fueled by the recognition that cost is now an increasingly important factor in the procurement and deployment of electronic systems by the military. This is made evident by a clear trend toward relaxation of strict adherence to military specifications and requirements, if acceptable functionality can be demonstrated at lower costs. For example, recent efforts have been made to adapt commercial-off-the-shelf (COTS) technologies and hardware for military use.

Recognizing this evolution in thinking, there is a need for a low-cost, alkaline manganese-based or like primary battery for a tactical electronic equipment, which approximates the temperature range and power density capabilities of lithium sulfur dioxide batteries.

SUMMARY

In accordance with the present invention, there is described a self-warming battery comprising at least one battery cell for storing electrical energy, and battery self-warming circuit means coupled to the battery cell for selectively causing current flow through the battery cell in an initializing mode when the battery cell temperature is below a predetermined level. The current flow through the battery cell during the initializing mode, stimulates additional current flow in the battery cell.

The battery self-warming circuit means, in accordance with another aspect of the present invention, selectively operates primary warming means disposed adjacent to the battery cell or cells in a warming mode. During the warming mode, the primary warming means is powered by the battery cell and warms the battery cell to a setpoint temperature at which the battery cell's power delivery capability is substantially increased over the battery cell's power delivery capability when the battery cell is near the predetermined temperature. Thus, the initializing mode and the warming mode enable the battery to be used in substantially less than an hour.

BRIEF DESCRIPTION OF THE DRAWINGS

For a detailed understanding of the present invention, reference should be made to the following detailed description taken in conjunction with the accompanying drawings wherein.

FIG. IA is a cross-sectional view through line 1A—1A of FIG. 1B, showing the internal details of an exemplary embodiment of a battery in accordance with the present invention.

DETAILED DESCRIPTION OF THE INVENTION

The battery of the present invention provides a practical solution to the low temperature operating limitations that are inherent in alkaline manganese dioxide (AMD) or like cells thus, making such batteries useful for man-portable tactical military electronics systems. Batteries made in accordance with the present invention are also useful in applications where extreme cold conditions are not anticipated, such as desert operations, jungle warfare, or as a "training" battery—to be used in non-warfare operations where low temperature operation is not critical. Even then, with the extended low temperature operational capability afforded by the self-warming features of the present invention, effective usefulness of the battery is anticipated for environments where low temperatures reach −25 to −30 degrees C.

In order to overcome the low temperature operating limitations of the AMD cells, power is extracted from the batteries cells themselves, and used to raise the cell temperature. This is accomplished at extremely low temperatures that approach −30 degrees C. by first stimulating current flow by closing a very low resistance circuit across the battery terminals in an "initialization" mode. After current flow builds to a predetermined rate, a "warming" mode is initiated to warm battery cells to a predetermined level, thereby improving power delivery capability of the battery.

Figure 1A:
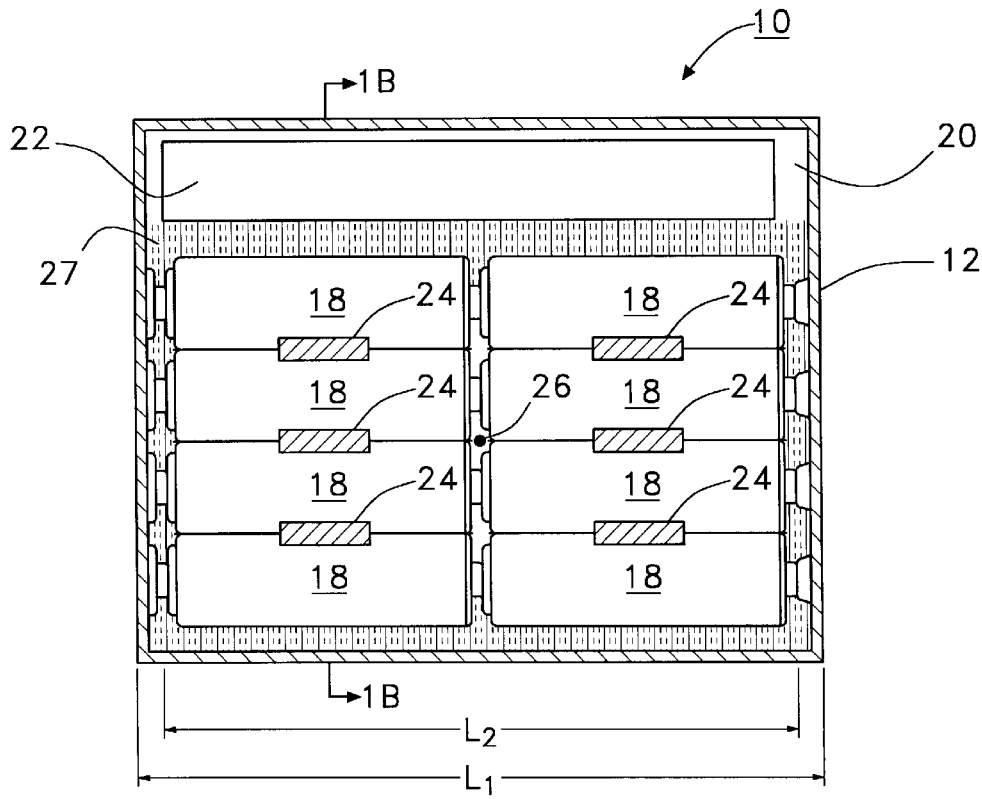
FIG. 1B is a cross-sectional view through line 1B—1B of FIG. IA.
Figure 1B:
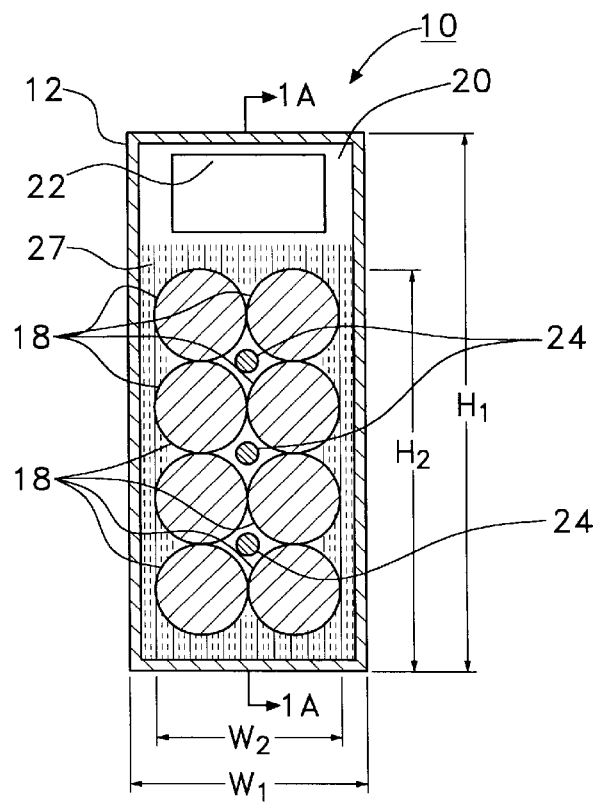

Referring to FIGS. 1A and 1B, there are shown cross-sectional views depicting an exemplary embodiment of the battery of the present invention, designated by the numeral 10. The shown embodiment is preferably compatible in form, fit, and function with a military BA-5590 battery. Accordingly, the battery 10 is comprised of a housing 12 which is dimensioned to contain up to 16, commercially available "C" sized alkaline manganese dioxide battery cells 18. As can be seen, 16 "C" sized battery cells 18 are arranged in two end-to-end groupings, each grouping stacked two battery cells wide and four battery cells high, and are electrically connected in series for primary power delivery and for battery self-heating. A space 20 is provided above the battery cells 18 for an external connector (not shown) and battery self-heating circuitry 22 which will be explained further on. A plurality of load resistors 24 are disposed between the battery cells 18 and are provided as heating elements. In the exemplary embodiment, each load resistor has a rating of 50 ohms and is capable of 8 watts of dissipation. Preferably six load resistors 24 are used when 16 "C" sized battery cells 18 are utilized in the battery 10. The six load resistors 24 are wired in parallel and will thus, deliver approximately 20–40 watts of heat in total, which will raise the battery cell temperatures at 30°–60° C. per hour. A temperature sensor 26 in the form of a thermistor or the like, is provided for monitoring the internal temperature of the battery housing 12, and is located centrally within the arrangement of battery cells 18. The arrangement of 16 "C" sized battery cells 18, six load resistors 24 and the centrally disposed temperature sensor 26, has a length $L_2$ of approximately 4 inches, a width $W_2$ of approximately 2 inches, and a height $H_2$ of approximately 4.125 inches. Accordingly the housing 12 has a maximum external length L1 of 4.4 inches, a maximum external width of 2.4 inches and a maximum height of 5 inches, which are the maximum dimensions specified for a military BA-5590 battery. The battery cells 18 are thermally insulated so that most of the internally generated heat will be contained around the cells, rather than lost to the cold equipment and surroundings. This can be accomplished by wrapping the entire arrangement of battery cells 18, load resistors 24 and temperature sensor 26 in thermal insulation. In the embodiment shown, the battery cells are surrounded with thermal insulation 27.

Figure 2:
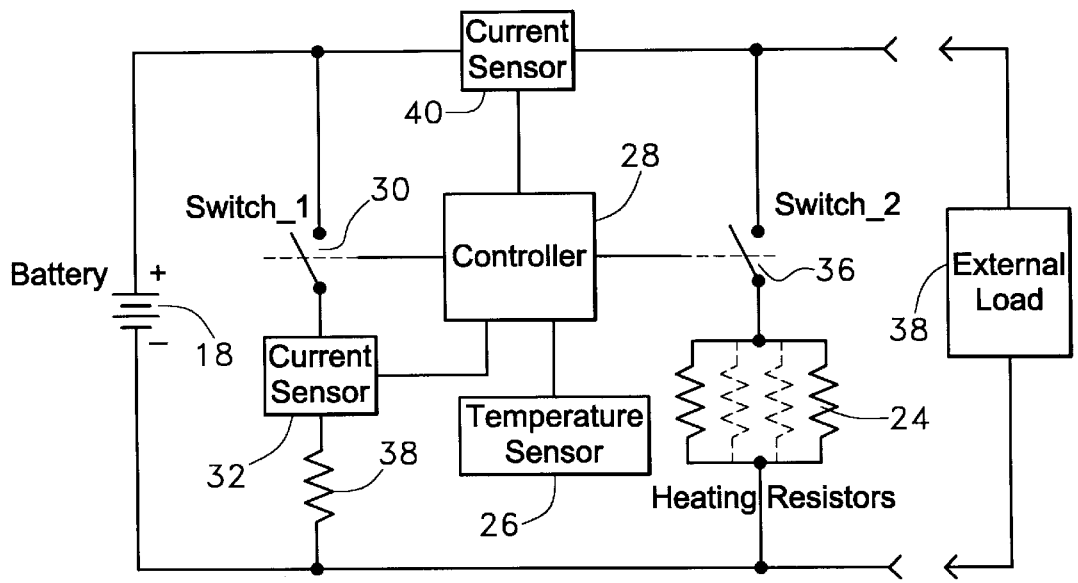
FIG. 2 is an electrical schematic of one embodiment of the self-warming circuitry used in the battery of the present invention.

Referring to FIG. 2, an electrical schematic of the battery self-warming circuitry 22 is shown. In order to raise the battery cells' temperature in the warm up mode, heat is generated within the battery cells 18 when the temperature immediately external to the cells drops to or below a predetermined low temperature threshold value. In the preferred embodiment, the self-warming circuitry has a predetermined low temperature threshold of approximately −10 degrees C., the temperature at which AMD cell performance falls precipitiously. Other embodiments of the present invention, which use different battery cell chemistries, would be provided with temperature sensors having predetermined low temperature threshold values adjusted in accordance with the low temperature performance characteristics inherent for each cell chemistry type. The temperature of the battery cells 18 is measured by the combination of the temperature sensor 26 and the controller 28. Referring to the example response curves of FIG. 3, operation commences when the current sensor 40 detects attachment of an electrical load to the battery assembly 10. Otherwise the heating system is inactive. If the battery temperature is below a predetermined thermal setpoint T I when current demand is initiated, the controller 28 enables switch_1 30 which provides a battery current path from the battery cells 18 through a low ohmage resistance element 38 in an initializing mode. The low ohmage resistance element 38 limits the magnitude of current flow through it to a level which will not damage the battery cells 18, but will provide sufficient internal self warming of the battery cells. The current limiting is set appropriately for the various designs taking into account the number of battery cells, the battery cell chemistry, and the current required. The low ohmage resistor 38 stimulates current flow which results in cell warming due to the cell's internal resistance. As is a well known, internal resistance is an inherent quality of battery cells. This is illustrated in the graph of FIG. 4, which shows a comparison of internal resistance and voltage as a function of service life for a DURACELL alkaline MN 1400 "C" sized battery cell.

Figure 3:
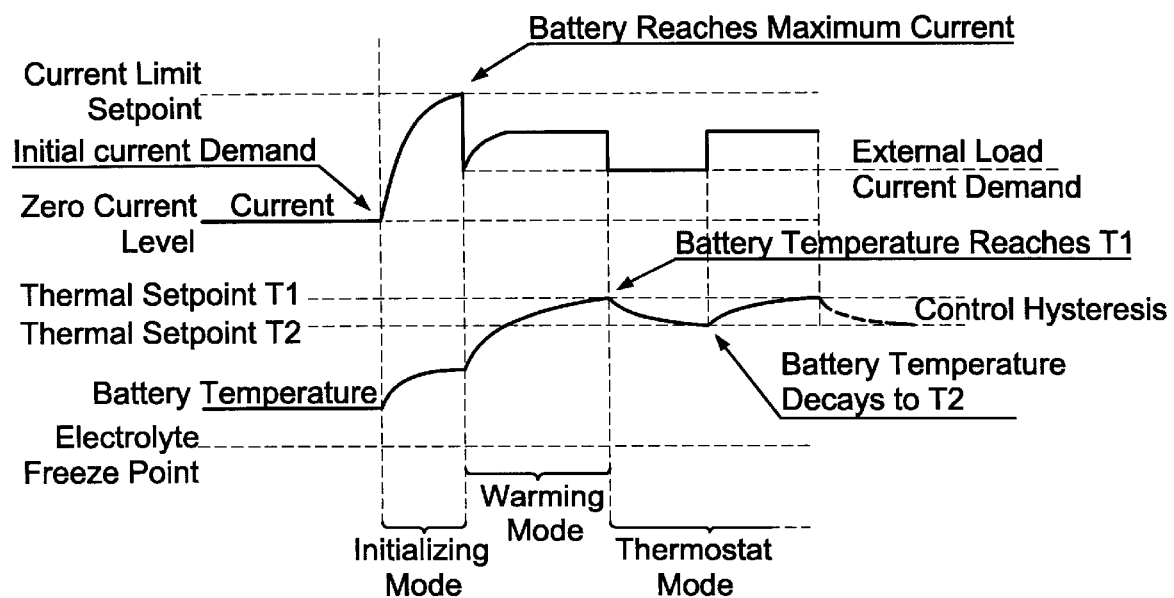
FIG. 3 depicts an exemplary operational response curve of the battery of the present invention.
Figure 4:
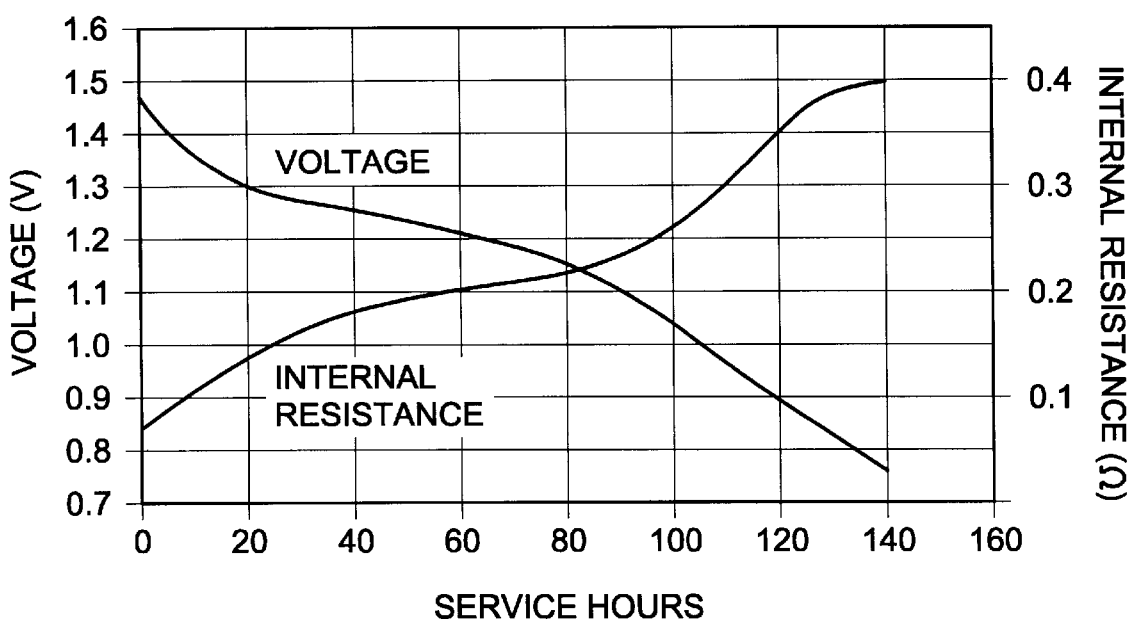
FIG. 4 is a graph which compares the internal resistance and voltage as a function of service life for a DURACELL alkaline MN1400 "C" sized battery cell.

Referring again to FIG. 2 along with FIG. 3, after switch_1 30 is closed, the battery temperature rises which results in increasing current level flowing through the current sensor 32. Shortly after switch_1 30 closes, the current reaches a predetermined current setpoint which is detected by the combination of the current sensor 32 and the controller 28. Once the current setpoint has been detected, the controller 28 issues a signal to open switch_1 30, which interrupts the flow of current through to the low ohmage resistance element 38. At this time, a signal is sent by the controller 28 to close switch_2 36. This action switches the current path from the low ohmage resistance element 38 to the heating resistors 24, which then provide heat external to the battery cells in a warming mode. As the heating resistors 24 generate heat, the cells'temperature increases, thereby substantially improving the power delivery capability of the battery cells 18. Once the temperature rises to setpoint T1, the controller 28 releases switch_2 36 which removes the heating resistors 24 from the circuit and the controller 28 settles into a thermostat mode. In the thermostat mode, the temperature will thereafter remain within the temperature range between thermal setpoints T1 and T2, or higher, due to: (1) cell internal resistance warming as the battery provides current to the load or, (2) ambient temperature increase or, (3) due to periodic re-application of the warming mode when the sensed temperature falls to temperature setpoint T2. The heating resistors 24 are selected and sized appropriately for various specific designs taking into account the number of battery cells, the type of battery cell, the number of battery cells dedicated to battery warm up, etc., such that battery warn-up may be accomplished in, typically, a number of minutes rather than in a number of hours.

The battery self-warming circuit 22 is only enabled when the controller 28 via the current sensor 34, senses a demand for current external to the battery's 10 terminals. This feature prevents stored batteries from self discharging unnecessarily if storage temperature falls below the predetermined low temperature threshold. The components used in the battery self-warming circuit 22 are conventional and can therefore, be selected as desired by one of ordinary skill in the art. For example, the switches can be comprised of field effect transistors, mechanical relays, or other semiconductor devices.

It should be understood that the embodiment described herein is merely exemplary and that a person skilled in the art may make many variations and modifications to the embodiment utilizing functionally equivalent elements to those described herein. More specifically the battery of the present invention is not limited to any specific form, nominal battery voltage, nominal battery capacity, or specific low temperature warn up or shut down set points. Rather, the concept described herein is intended to apply broadly to any assembly of battery cells (cell pack) or battery construction (battery) which employs one or more alkaline manganese dioxide cells or other like cells constructed from other electrochemical materials that have inherent low temperature operating limitations. If the battery temperature is between setpoints TI and T2 when current demand is initiated from the battery load 38, the controller 28 enables switch_2 36, and does not close switch_1 30, thereby enabling the heating without first enabling the warming mode. If the battery temperature is above setpoint T1 when current demand is initiated from the battery load 38, the controller 28 does not enable either switch_1 30 nor switch_2 36.

The preferred embodiment described herein defines a two stage control system comprised of a low resistance stage to enable battery internal warming and a heating resistor stage which provides heat external from the cells. It is contemplated that other embodiments of the present invention can have a single control stage or more than two control stages for sensing and heating control. The present invention is further intended to apply to any cell pack or battery design where low temperature performance must be extended downwards in order to make the selected cell chemistry usable in the intended application or environment.

Any and all such variations or modifications as well as others which may become apparent to those skilled in the art, are intended to be included within the scope of the invention as defined by the appended claims.

What is claimed is:

1. A self-warming battery comprising:
   at least one battery cell for storing electrical energy; and
   battery self-warming circuit means coupled to said at least one battery cell for selectively causing current flow through said at least one battery cell in an initialization mode when said at least one cell is below a predetermined temperature;
   wherein said current flow through said at least one battery cell during said initializing mode, stimulates further current flow in said at least one battery cell, said circuit means is activated only when an external demand for current is made on said battery.

2. The self-warming battery according to claim 1, wherein said circuit means comprises:
   low ohmage means for causing said current flow through said at least one battery cell in said initializing mode; and
   controller means for selectively coupling said at least one battery cell to said low ohmage means when said at least one cell is below said predetermined temperature.

3. The self-warming battery according to claim 2, wherein said circuit means further comprises current sensing means coupled to said low ohmage means and said controller means, said current sensing means operating in conjunction with said controller means for detecting when said further current flow through said at least one battery cell during said initializing mode achieves a predetermined threshold value.

4. The self-warming battery according to claim 3, further comprising primary heating means disposed adjacent to said at least one battery cell for generating heat in a warming mode to increase the temperature of said at least one battery cell, wherein said controller means, in response to said detection of said current flow of said predetermined threshold value, selectively couples said at least one battery cell to said primary heating means to launch said warming mode, thereby generating heat to increase the temperature of said at least one battery cell to a setpoint temperature at which said at least one battery cell's power delivery capability is substantially increased over said at least one battery cell's power delivery capability when said at least battery cell is near said predetermined temperature.

5. The self-warming battery according to claim 4, wherein said controller means, in further response to said detection of said current flow of said predetermined threshold value, selectively uncouples said at least one battery cell from said low ohmage means thereby terminating said initializing mode.

6. The self-warming battery according to claim 4, wherein said controller means selectively uncouples said at least one battery cell from said primary heating means thereby terminating said warming mode when said at least one battery cell reaches said setpoint temperature at which said at least one battery cell's power delivery capability is substantially increased.

7. A self-warming battery for use in tactical electronics systems, comprising:
   at least one battery cell for storing electrical energy;
   temperature sensing means disposed adjacent to said at least one battery cell for monitoring the temperature of said at least one battery cell; and
   battery self-warming circuit means coupled to said at least one battery cell and said temperature sensing means, for selectively causing current flow through said at least one battery cell in an initializing mode when said temperature sensing means detects that said at least one cell is below a predetermined temperature;
   wherein said current flow through said at least one battery cell during said initializing mode, stimulates further current flow in said at least one battery cell, said circuit means is activated only when a current sensor means coupled to a controller detects an external demand for current on said battery.

8. The self-warming battery according to claim 7, wherein said circuit means comprises:
   low ohmage means for causing said current flow through said at least one battery cell in said initializing mode; and
   controller means coupled to said temperature sensing means and operating in conjunction therewith to detect said predetermined temperature and selectively coupling said at least one battery cell to said low ohmage means.

9. The self-warming battery according to claim 8, wherein said circuit means further comprises current sensing means coupled to said low ohmage means and said controller means, said current sensing means operating in conjunction with said controller means for detecting when said current flow through said at least one battery cell during said initializing mode achieves a predetermined threshold value.

10. The self-warming battery according to claim 9, further comprising primary heating means disposed adjacent to said at least one battery cell, for generating heat in a warming mode to increase the temperature of said at least one battery cell, wherein said controller means, in response to said detection of said current flow of said predetermined threshold value, selectively couples said at least one battery cell to said primary heating means to launch said warming mode, thereby generating heat to increase the temperature of said at least one battery cell to a setpoint temperature at which said at least one battery cell's power delivery capability is substantially increased over said at least one battery cell's power delivery capability when said at least battery cell is near said predetermined temperature.

11. The self-warming battery according to claim 10, wherein said controller means, in further response to said detection of said current flow of said predetermined threshold value, selectively uncouples said at least one battery cell from said low ohmage means thereby terminating said initializing mode.

12. The self-warming battery according to claim 10, wherein said controller means selectively uncouples said at least one battery cell from said primary heating means thereby terminating said warming mode when said at least one battery cell reaches said setpoint temperature at which said at least one battery cell's power delivery capability is substantially increased.

13. A self-warming battery for use in tactical electronics systems, comprising:
   a housing;
   at least one battery cell of a given size and cell chemistry, for storing electrical energy, disposed in said housing;
   temperature sensing means disposed adjacent to said at least one battery cell of said given size and cell chemistry for monitoring the temperature of said at least one battery cell of said given size and cell chemistry; and
   battery self-warming circuit means disposed in said housing and coupled to said at least one battery cell of said given size and cell chemistry and said temperature sensing means, for selectively causing current flow through said at least one battery cell of said given size and cell chemistry in an initializing mode when said temperature sensing means detects that said at least one battery cell of said given size and cell chemistry is below a predetermined temperature, and for selectively operating primary heating means disposed adjacent to said at least one battery cell of said given size and cell chemistry,said circuit means is activated only when an external demand for current is made on said battery, said primary heating means warming said at least one battery cell of said given size and cell chemistry in a warming mode to a setpoint temperature at which said at least one battery cell's power delivery capability is substantially increased over said at least one battery cell's power delivery capability when said at least battery cell of said given size and cell chemistry is near said predetermined temperature; whereby said initializing mode and said warming mode enable said battery to be used in substantially less than an hour.

14. The self-warming battery according to claim 13, wherein said at least one battery cell of said given size and cell chemistry is thermally insulated to substantially contain the heat generated within said housing.

15. The self-warming battery according to claim 14, wherein said at least one battery cell of said given size and cell chemistry and said primary heating means are surrounded in an insulative material which substantially contains the heat generated thereby.

16. The self-warming battery according to claim 13, wherein said given cell chemistry of said at least one battery cell comprises alkaline manganese dioxide.

17. The self-warming battery according to claim 16, wherein said given cell size comprises a "C" size.

18. The self-warming battery according to claim 13, wherein said primary heating means comprises at least one resistor.

* * * * *